United States Patent
Enomoto et al.

(10) Patent No.: US 6,817,178 B2
(45) Date of Patent: Nov. 16, 2004

(54) MASTER CYLINDER BODY AND DIE FOR MOLDING MASTER CYLINDER BODY

(75) Inventors: Naoyasu Enomoto, Handa (JP); Isao Sato, Nagoya (JP)

(73) Assignees: Aisin Seiki Kabushiki Kaisha, Kariya (JP); Hibino Industry Co., Ltd., Chiryu (JP)

( * ) Notice: Subject to any disclaimer, the term of this patent is extended or adjusted under 35 U.S.C. 154(b) by 78 days.

(21) Appl. No.: 10/226,219

(22) Filed: Aug. 23, 2002

(65) Prior Publication Data

US 2003/0061812 A1 Apr. 3, 2003

(30) Foreign Application Priority Data

Aug. 24, 2001 (JP) ........................................ 2001-254395

(51) Int. Cl.$^7$ .............................................. B60T 11/20
(52) U.S. Cl. ...................... 60/562; 92/169.2; 29/888.02
(58) Field of Search .......................... 92/169.2; 60/562, 60/581; 29/888.02, 888.06; 164/98; 249/172

(56) References Cited

U.S. PATENT DOCUMENTS

| | | | |
|---|---|---|---|
| 4,122,596 A | * 10/1978 | Fields | .................. 29/527.2 |
| 4,276,994 A | * 7/1981 | Spalding | .................. 60/533 |
| 4,687,042 A | * 8/1987 | Young | .................. 164/80 |
| 4,823,553 A | * 4/1989 | Reynolds | .................. 60/585 |
| 5,331,813 A | * 7/1994 | Heibel et al. | .............. 60/547.1 |

FOREIGN PATENT DOCUMENTS

JP    2001-30892 A    2/2001

\* cited by examiner

*Primary Examiner*—Edward K. Look
*Assistant Examiner*—Igor Kershteyn
(74) *Attorney, Agent, or Firm*—Burns, Doane, Swecker & Mathis, L.L.P.

(57) ABSTRACT

A master cylinder body and a die for molding the master cylinder body which is unlikely worn out by a flow of the melt and improves the life duration of the die. A rib provided from a first outlet port projected from right external peripheral surface of the master cylinder body to an end portion of a front end portion via a second outlet port is formed deviated from a line connecting a central axial lines of the first and the second outlet ports. Likewise, a rib provided from the first outlet port formed on a left external peripheral surface of the master cylinder body to the end portion of the front end portion via the second outlet port is formed deviated from the line connecting the central axial lines of the first and the second outlet ports.

6 Claims, 7 Drawing Sheets

MASTER CYLINDER BODY AND DIE FOR MOLDING MASTER CYLINDER BODY

This application is based on and claims priority under 35 U.S.C. §119 with respect to Japanese Patent Application No. 2001-254395 filed on Aug. 24, 2002, the entire content of which is incorporated herein by reference.

FIELD OF THE INVENTION

The present invention generally relates to a master cylinder. More particularly, the present invention pertains to a master cylinder body and a die for molding the master cylinder body.

BACKGROUND OF THE INVENTION

Master cylinders are applied as a part of a power transmission means in brake system of automobiles. As shown in FIG. 10, a master cylinder 60 includes a master cylinder body 61, a piston 62, and a reservoir 63. The master cylinder body 61 includes a hollow construction inside thereof and the brake fluid filled in the reservoir 63 is charged in the hollow space of the master cylinder body 61 via pipes (not shown).

By depressing a brake pedal of the automobile, the depression force is transmitted to the piston 62 slidably inserted into and supported by the master cylinder body 61 as shown in FIG. 10. The piston 62 is slid leftward of FIG. 10, the connection between the master cylinder body 61 and the reservoir 63 is interrupted, and the hydraulic pressure is generated in the brake fluid charged in the master cylinder body 61. The hydraulic pressure is transmitted to a brake mechanism (not shown) via outlet ports 64, 65 projected from an external peripheral side surface of the master cylinder body 61 to operate the brakes.

The master cylinder body 61 having the foregoing construction is manufactured by the aluminum die casting. That is, the melt of the aluminum alloy is poured into a die having a predetermined configuration for molding the master cylinder body 61 via a sprue (i.e., a tip end surface 61a side of the master cylinder body 61). By cooling down the melt poured into the die, the master cylinder body 61 is formed. In this regard, the melt may be partially cooled down to be solidified before being charged into the outlet ports 64, 65 because the volume of the outlet ports 64, 65 is large. Thus, the melt is hard to be flowed and the casting cavity is generated. The generation of the casting cavity not only deforms the configuration of the master cylinder body 61 but also deteriorates the rigidity of the master cylinder body 61.

In order to restrain the generation of the casting cavity, as shown in FIG. 10, a rib 66 is provided from the outlet port 64 to the tip end surface 61a of the master cylinder 61 on an imaginary line perpendicularly crossing the central axial lines of the outlet ports 64, 65. A space for molding the rib 66 is formed in the die to improve the flow of the melt. Thus, the generation of the casting cavity in the outlet ports 64, 65 can be prevented.

The rib 66 is formed from the outlet port 65 to the tip end surface 61a of the master cylinder body 61 on the imaginary line crossing the central axial lines of the outlet ports 64, 65. When the melt is introduced from the sprue (i.e., the tip end surface 61a side), the melt directly collides with projections of the die for molding the outlet ports 64, 65, thus the abrasion of the portion of the die for molding the outlet ports 64, 65 were notable. The abrasion of the portion for forming the outlet ports 64, 65 is the drawback for improving the life duration of the die.

A need thus exists for a master cylinder body and a die for molding the master cylinder body which improves the life duration of a die of the master cylinder body which is unlikely worn out by the flow of the melt.

SUMMARY OF THE INVENTION

In light of the foregoing, the present invention provides a master cylinder body which includes a first output port for outputting hydraulic pressure, a second output port for outputting the hydraulic pressure, and a rib formed between the first and the second port portions towards a tip end portion of the master cylinder body for improving a flow of melt. The rib is formed along a position deviated from a line connecting central axial lines of the first and the second output port portions.

According to another aspect of the present invention, a die of a master cylinder body which includes a first and a second output ports for outputting hydraulic pressure and a rib formed between the first and the second output port portions for improving a flow of melt towards a tip end portion includes a first port molding recess portion, a second port molding recess portion, a first projection formed on the first port molding recess portion, a second projection formed on the second port molding recess portion, and a rib molding recess portion. The rib molding recess portion is formed on a position deviated from a line connecting a central axial lines of the first and the second projections formed on the first and the second port molding recess portions.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

A first embodiment of a master cylinder body will be explained with reference to FIGS. 1–6.

Figure 1:
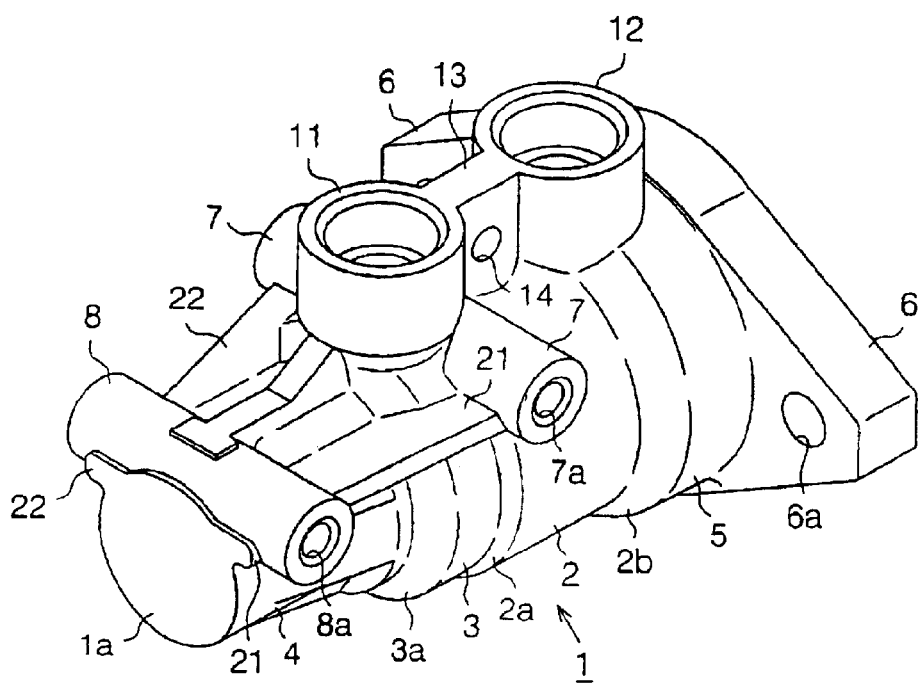
FIG. 1 is a perspective view of a master cylinder body according to a first embodiment of the present invention.

As shown in FIG. 1, a master cylinder body 1 includes a cylindrical shape with a bottom. The master cylinder body 1 is made of aluminum alloy. A rear end surface of the master cylinder body 1 has an opening and the inside of the master cylinder body 1 is hollow.

As shown in FIG. 1, the master cylinder body 1 includes an intermediate diameter portion 2 which is located at the middle portion thereof, a small diameter portion 3 whose diameter is smaller than the diameter of the intermediate diameter portion 2 via a first tapered portion 2a, and a front end portion 4 whose diameter is further smaller than the small diameter portion 3 via a second tapered portion 3a. The master cylinder body 1 includes a large diameter portion 5 whose diameter is larger than the intermediate diameter portion 2 via a tapered portion 2b adjacent to the intermediate diameter portion 2.

Figure 4:
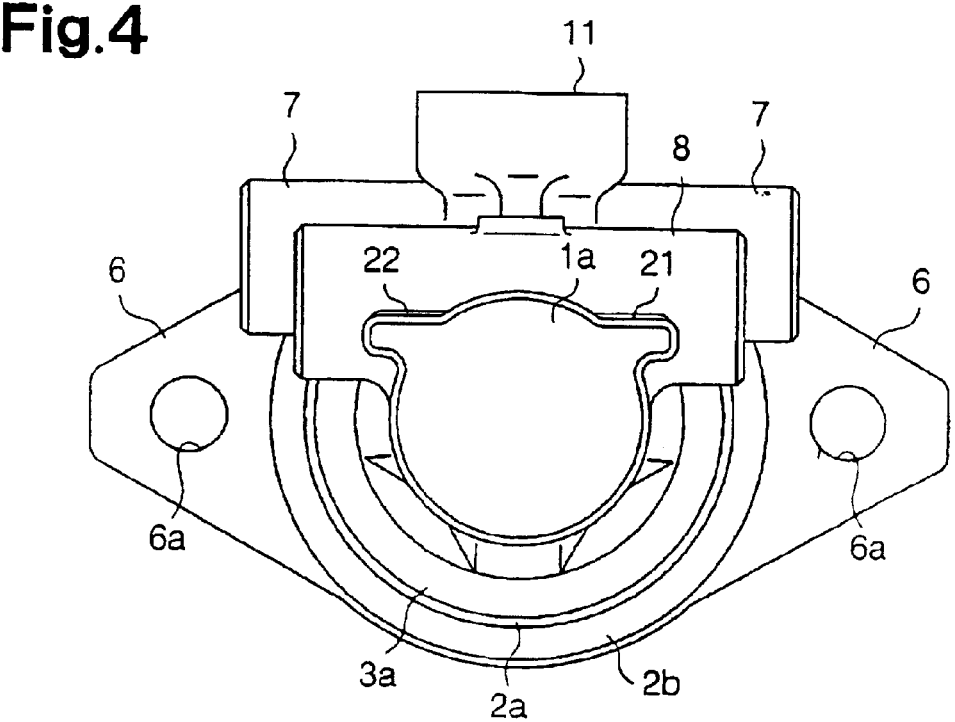
FIG. 4 is a front view of the master cylinder body according to the first embodiment of the present invention.
Figure 5:
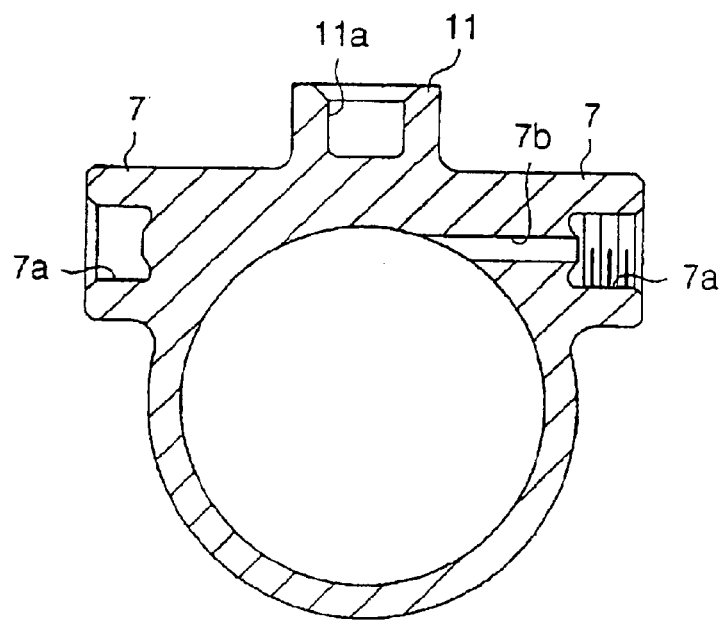
FIG. 5 is a cross-sectional view of the master cylinder body according to the first embodiment of the present invention.

Flange portions 6 for connecting to a brake booster (not shown) are formed on a rear-right and rear left side of the larger diameter portion 5. As shown in FIG. 4, bores 6a, 6a are formed on a pair of the flange portions 6. The pair of the flange portions 6 and the brake booster is screwed up by putting screws into bores 6a.

A pair of first outlet ports 7 serving as a first outlet port portion is outwardly projected in the right, left direction on a top external peripheral surface of the intermediate diameter portion 2. Connecting recess portions 7a are formed on the tip end internal surfaces of the first outlet ports 7 on the right and left respectively.

Figure 3:
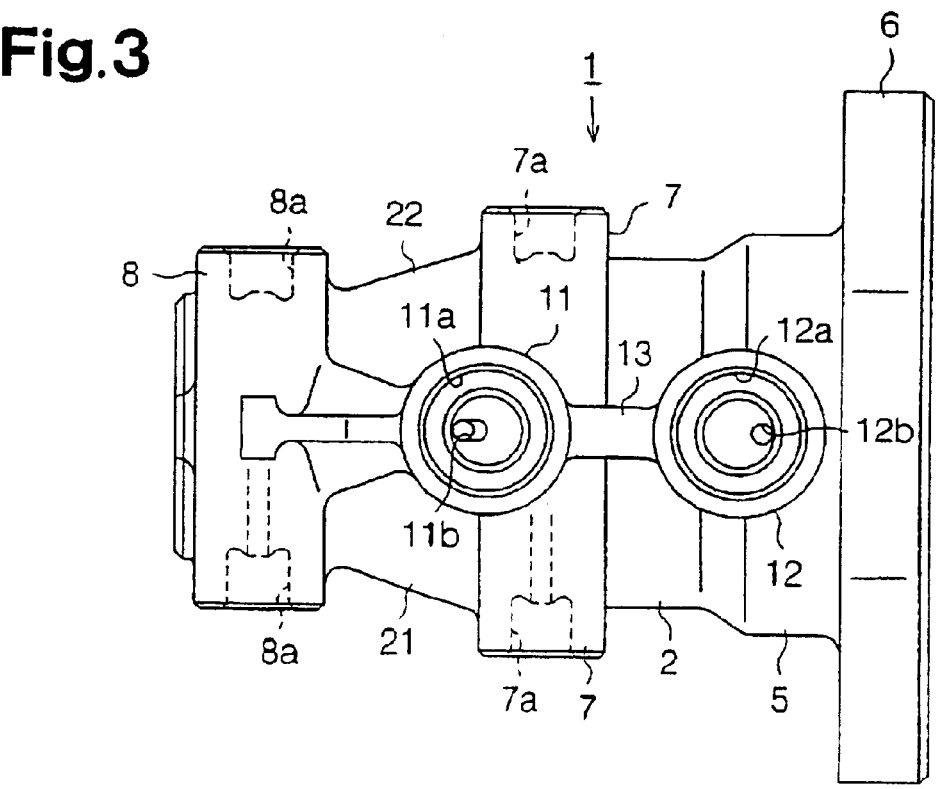
FIG. 3 is a top view of the master cylinder body according to the first embodiment of the present invention.

A pair of second outlet ports 8 serving as a second outlet port is outwardly projected in the right, left direction, likewise the first outlet ports 7, on the top peripheral surface of the front end portion 4. The second outlet ports 8 are configured to be shorter in the longitudinal direction than the longitudinal length of the first outlet ports 7 (shown in FIG. 3). As shown in FIG. 3, connecting recess portions 8a are formed on the internal tip end surfaces of the second outlet ports 8 on the right and the left side respectively likewise the first outlet ports 7.

Either one of right side or left side of the first outlet ports 7 and either one of right side or left side of the second outlet ports 8 are used depending on the usage mode of the master cylinder. According to the first embodiment of the present invention, right side of the first and the second outlet ports 7, 8 are used. Thus, after molding the master cylinder body 1 with a die, a first penetration bore 7b, and a second penetration bore 8b penetrated through the hollow internal portion of the master cylinder body 1 are formed on the connecting recess portions 7a, 8a, of the first and the second outlet ports 7, 8. Screw groove for screwing pipes for introducing the hydraulic pressure of the brake fluid to the brake mechanism is formed on the internal peripheral portion of the connecting recess portions 7a, 8a, of the first and the second outlet ports 7, 8 respectively.

Figure 10:
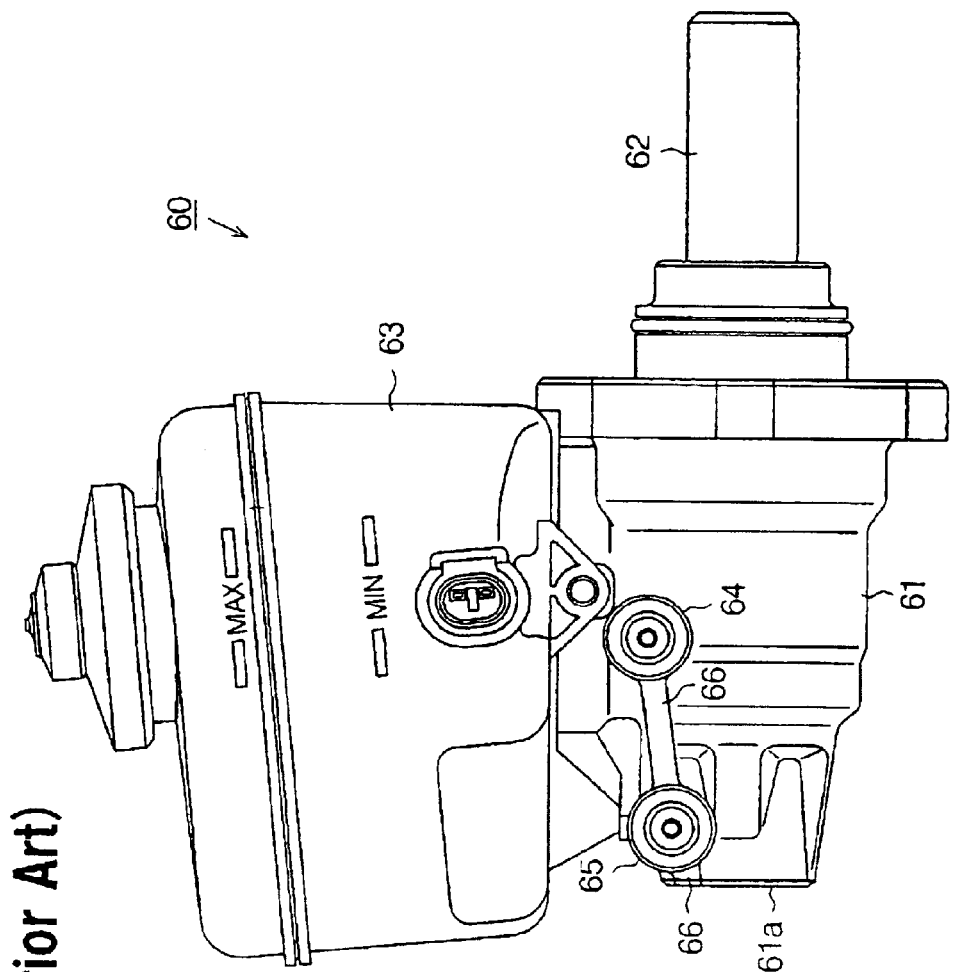
FIG. 10 is a plan view of a known master cylinder.

As shown in FIGS. 1–5, a first inlet port 11 serving as a connecting member for supplying the brake fluid into the hollow internal portion of the master cylinder body from a reservoir 63 (i.e., shown in FIG. 10) for reserving the brake fluid is formed to be projected on the top front side of the first outlet ports 7.

A port recess portion 11a is formed on a tip end internal surface of the first inlet port 11. A first supply bore 11b penetrated through the hollow internal portion of the master cylinder body 1 is formed on a bottom surface of the port recess portion 11a.

Likewise the first inlet port 11, a second inlet port 12 serving as a connecting member for supplying the brake fluid to the hollow internal portion of the master cylinder body 1 from the reservoir 63 is formed on the top portion of the large diameter portion 5. A port recess portion 12a is formed on a tip end internal surface of the second inlet port 12. A second supply bore 12b penetrated through the hollow internal portion of the master cylinder body 1 is formed on a bottom surface portion of the port recess portion 12a.

A bridging portion 13 is formed between the first inlet port 11 and the second inlet port 12. A fixing bore 14 for connecting the master cylinder body 1 and the reservoir 63 is formed on the central portion of the bridging portion 13. Accordingly, the brake fluid is charged into the hollow internal portion of the master cylinder body 1 from the reservoir 63 via the first and the second supply bores 11b, 12b of the first inlet port 11 and the second inlet port 12.

Figure 2:
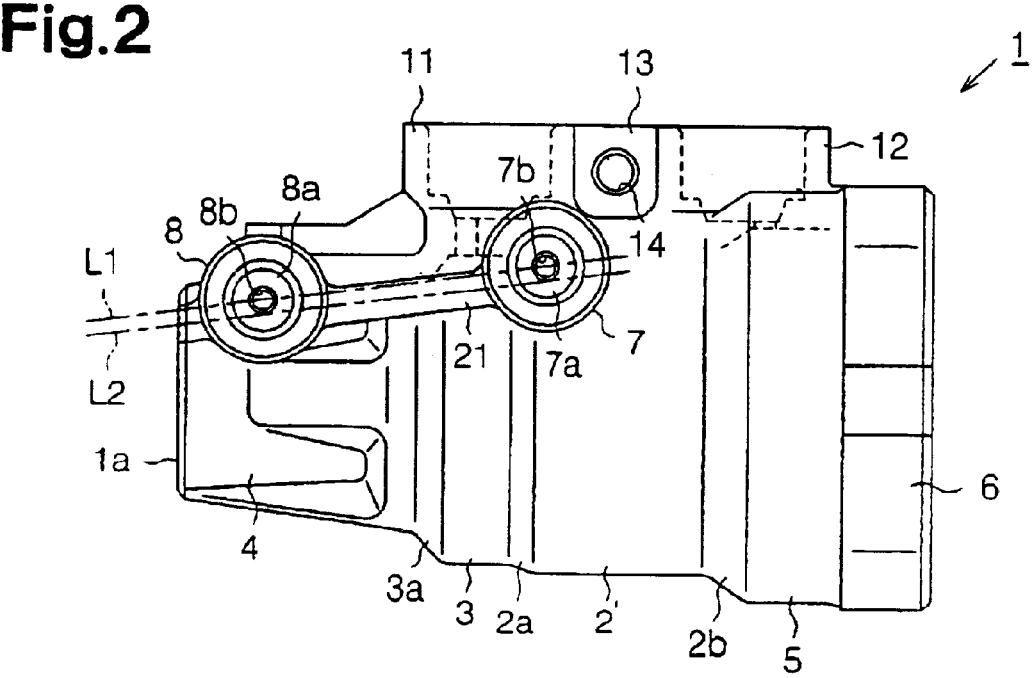
FIG. 2 is a right side view of the master cylinder body according to the first embodiment of the present invention.

As shown in FIGS. 2–4, the master cylinder body 1 with the foregoing construction is provided with a right side rib 21 and a left side rib 22 on right and left external peripheral surface extended from the first outlet port 7 to an end portion of the front end portion 4 via the second outlet port 8.

As shown in FIG. 2, the right side rib 21 is provided to be extended along a line L2 which is positioned below a line L1 (i.e., position closer to the flange portion 6) and is in parallel with the line L1 which is connecting central axial lines of the outlet port 7 and the outlet port 8. That is, the right side rib 21 is extended between an external peripheral surface of the first outlet port 7 and an external peripheral surface of the second outlet port 8 and between the external peripheral surface of the second outlet portion 8 and the tip end portion of the front end portion 4 along the line L2.

Likewise, the left side rib 22 is provided to be extended along a line corresponding to the line L2 which is in parallel with a line corresponding to the line L1 connecting the outlet port 7 and the outlet port 8 and is positioned below the line (i.e., the position closer to the flange portion 6). That is, the left side rib 22 is extended between the external peripheral surface of the first outlet port 7 and the external peripheral surface of the second outlet port 8 and between the external peripheral surface of the second outlet port 8 and the tip end portion of the front end portion 4 along the line corresponding to the line L2.

A predetermined member such as piston (not shown) is equipped in the master cylinder body 1 of the foregoing construction. By depressing the brake pedal, the piston is moved forward of the master cylinder body 1 via the brake booster connected to the flange portion 6. Then, the hydraulic pressure is generated in the brake fluid charged in the master cylinder body 1 and the hydraulic pressure is outputted from the first outlet port 7 and from the second outlet port 8 to operate the brake mechanism.

Molding method of the master cylinder body 1 with the foregoing construction will be explained referring to FIG. 6. The master cylinder body 1 is manufactured by die casting.

Figure 6:
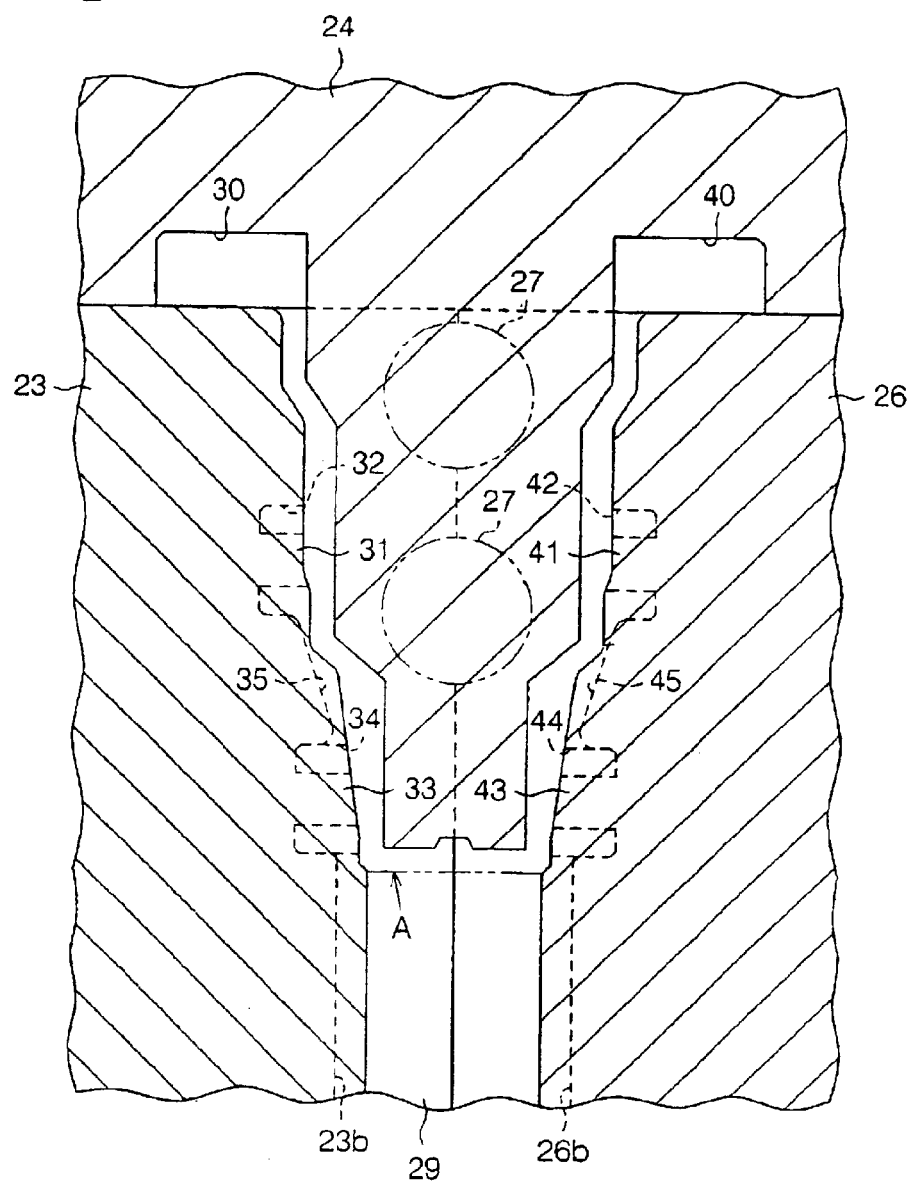
FIG. 6 is a cross-sectional view of a die for molding the master cylinder according to the first embodiment of the present invention.

As shown in FIG. 6, a die for molding the master cylinder body 1 includes a fixed die 23, a movable die 26, and a rear portion movable die 27 which is shown with chain double dashed line. A cavity for molding the left half portion of the master cylinder body 1 is formed with a top portion movable die 24 and the fixed die 23. A flange molding recess portion 30 for molding the flange portion 6 is formed on the top movable die 24. A first port molding recess portion 32 having a projection 31 in the center is formed on the fixed die 23 in order to mold the left side first outlet port 7 having the connecting recess portion 7a. A second port molding recess portion 34 having a projection 33 in the center is formed on the fixed die 23 in order to form the left side second outlet port 8 having the connecting recess portion 8a.

A left side rib molding recess portion 35 for molding the left side rib 22 is formed on the fixed die 23. In this case, because the left side rib 22 is provided to be extended along the line corresponding to the line L2 positioned below the line corresponding to the line L1 and in parallel with the line corresponding to the line L1 connecting the central axis of the outlet port 7 and the outlet port 8 and, the left side rib molding recess 35 is formed at the position deviated from the projections 31, 33 (i.e., central axis line of the projections) for molding the connecting recess portions 7a, 8a of the first and the second outlet ports 7, 8.

On the other hand, the top movable die 24 and the movable die 26 form the space for molding the right half of the master cylinder 1. A flange molding recess portion 40 for molding the flange portion 6 is formed on the top portion movable die 24. A first port molding recess portion 42 having a projection 41 in the center is formed on the central portion of the movable die 26 for molding the right side first outlet port 7 having the connecting recess portion 7a. A second port molding recess portion 44 having a projection 43 in the center is formed on the central portion of the movable die 26 for molding the second outlet port 8 having the right side connecting recess portion 8a.

A right side rib molding recess portion 45 for molding the right side rib 21 is formed on the movable die 26. In this case, because the right side rib 21 is extended along the line corresponding to the line L2 in parallel with the line corresponding to the line L1 connecting the central axial lines of the outlet port 7 and the outlet port 8 and is positioned below the line corresponding to the line L1, the right side rib molding recess portion 45 is positioned deviated from the projections 41, 43 (i.e., central axial lines of the projections) for molding the connecting recess portion 7a, 8a of the first and the second outlet ports 7, 8.

Space for molding a tip end portion of the master cylinder body 1 is formed with the fixed die 23, the top portion movable die 24, and the movable die 26. A sprue 29 is formed with the fixed die 23 and the movable die 26. The melt of the aluminum alloy is introduced from the sprue 29. The opening configuration of the sprue 29 is identical with the external configuration of the tip end surface 1a of the master cylinder body 1 as shown in FIG. 4. Thus, recess portions 26b, 23b in communication with the right side and the left side rib molding recess portions 45, 35 for molding the right side rib 21 and the left side rib 22 are formed on the movable die 26 and the fixed die 23 respectively.

A space for molding the first and the second outlet ports 11, 12 is formed with the top portion movable die 24, the fixed die 23, the movable die 26, and the rear portion movable die 27.

After coupling and performing the mold clamping of the fixed die 23, the top movable die 24, the movable die 26, and the rear portion movable die 27, the melted aluminum alloy with high temperature is poured from the sprue 29 for molding. By cutting a molded component at portion A after molding, the master cylinder body 1 is molded.

When the melted aluminum alloy is poured from the sprue 29, part of the aluminum alloy with high temperature is flowed into the left side and the right side second port molding recess portions 34, 44 via the recess portions 23b, 26b formed at the sprue 29.

In this case, because the recess portions 23b, 26b are deviated from the projections 33, 43 (i.e., central axial lines of the projections) formed on the left side and the right side second port molding recess portions 34, 44, the projections 33, 44 do not directly receive large amount of the melted aluminum alloy with high temperature which is flowed into the second port molding recess portions 34, 44. Thus, most of the melted aluminum alloy with high temperature flowed into the second port molding recess portions 34, 44 is smoothly flowed rearward along the deviated side of the external peripheral surface of the projections 33, 43.

The melted aluminum alloy with high temperature flowed into the second port molding recess portions 34, 44 to flow rearward along the deviated side of the external peripheral surface of the projections 33, 43 is introduced into the first port molding recess portions 32, 42 via the left side and the right side rib molding recess portions 35, 45. In this case, because the left side and right side rib molding recess portions 35, 45 are deviated relative to the projections 31, 41 (i.e., central axial lines of the projections) formed on the left side and right side first port molding recess portions 32, 42, the projections 31, 41 do not directly receive the large amount of the melted aluminum alloy with high temperature flowed into the first port molding recess portions 32, 42. Thus, most of the melted aluminum alloy with high temperature flowed into the first port molding recess portions 32, 42 is smoothly flowed towards the rear flange molding recess portions 30, 40 along the external peripheral surface of the deviated side of the projections 31, 41.

With the master cylinder body 1 according to the first embodiment, the following characteristic can be obtained.

With respect to the first embodiment, the molding positions of the right side rib 21 and the left side rib 22 for restraining the generation of the casting cavity are deviated below the central position of the first and the second outlet ports 7, 8. Because the melt of the aluminum alloy do not directly collide with the projections 31, 33, 41, 43 for molding the first and the second outlet ports 7, 8 when molding the master cylinder body 1, the abrasion of the projections 31, 33, 41, 43 can be restrained. Accordingly, the life duration of the die can be improved.

With respect to the first embodiment, the molding position of the right side rib 21 and the left side rib 22 for restraining the generation of the casting cavity is deviated below the central position of the first and the second outlet ports 7, 8. Thus, because the left side and the right side rib molding recess portions 35, 45 are positioned closer to the flange molding recess portions 30, 40, the large amount of the melt aluminum alloy can be effectively poured into the flange molding recess portions 30, 40 which require the large amount of the melt aluminum alloy. Accordingly, the dent and the amount of the casting cavity of the flange portion 6 can be reduced.

A second embodiment of a master cylinder body according to the present invention will be explained referring to FIGS. 7–9. The construction of the master cylinder body of the second embodiment is the same with the construction of the master cylinder body of the first embodiment except the molding position of the right side rib 21 and the left side rib 22, and the assembling direction of the flange portion 6. Thus, the explanations for the common construction will be omitted.

Figure 7:
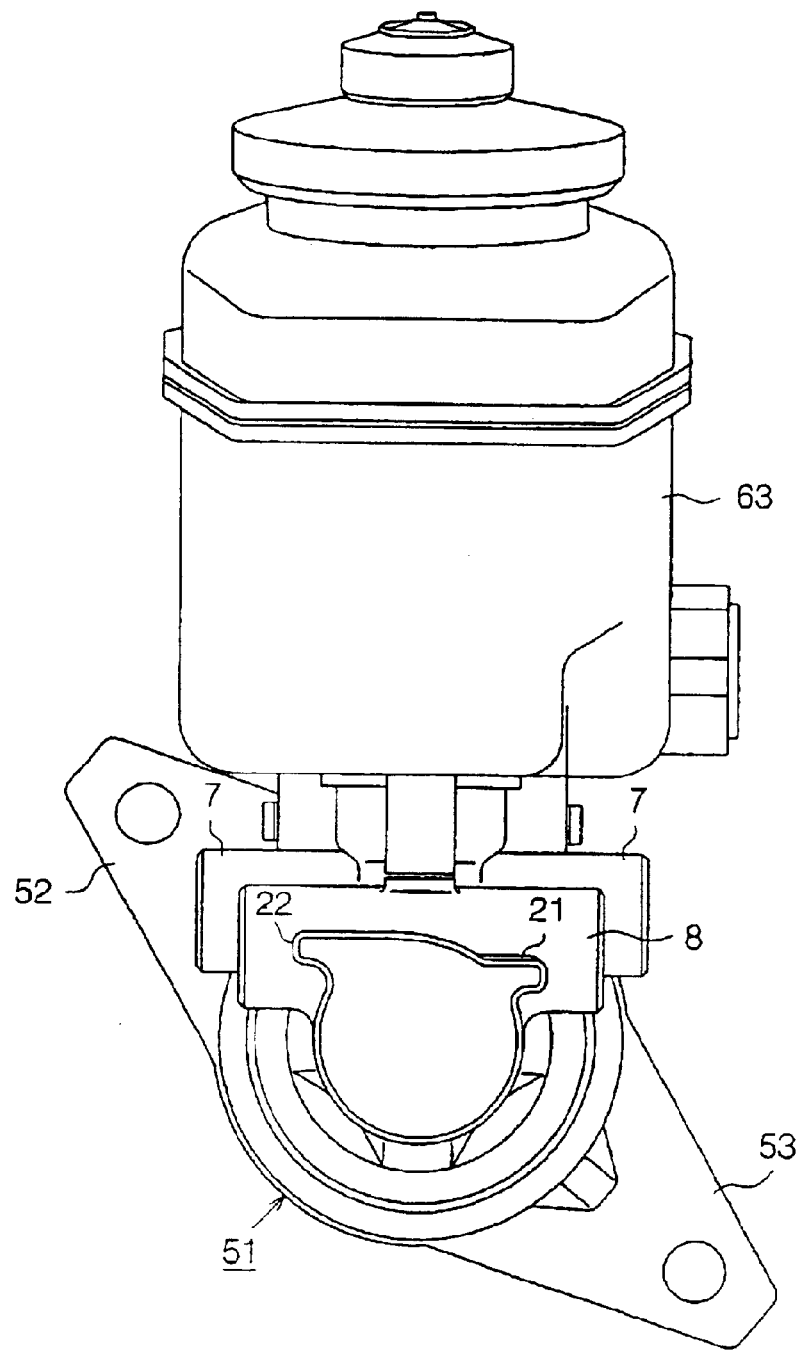
FIG. 7 is a plan view of a master cylinder body according to a second embodiment of the present invention.

FIG. 7 is a front view of the master cylinder when a master cylinder body 51 is connected to a reservoir 63. FIG. 8 is a right side view of the master cylinder body 51. FIG. 9 is a left side view of the master cylinder body 51.

As shown in FIG. 7, the master cylinder body 51 is formed with a left side flange portion 52 outwardly extended in a diagonally upward direction relative to a horizontal line of the master cylinder body and is formed with a right side flange portion 53 extended in a diagonally downward direction relative to the horizontal line of the master cylinder body. The constructions of the flange portions 52, 53 are determined by the connecting construction relative to the booster (not shown) fixedly supported between the flange portions 52, 53. In the second embodiment, the molding positions of the right side rib 21 and the left side rib 22 are changed relative to the flange portions 52, 53.

Figure 8:
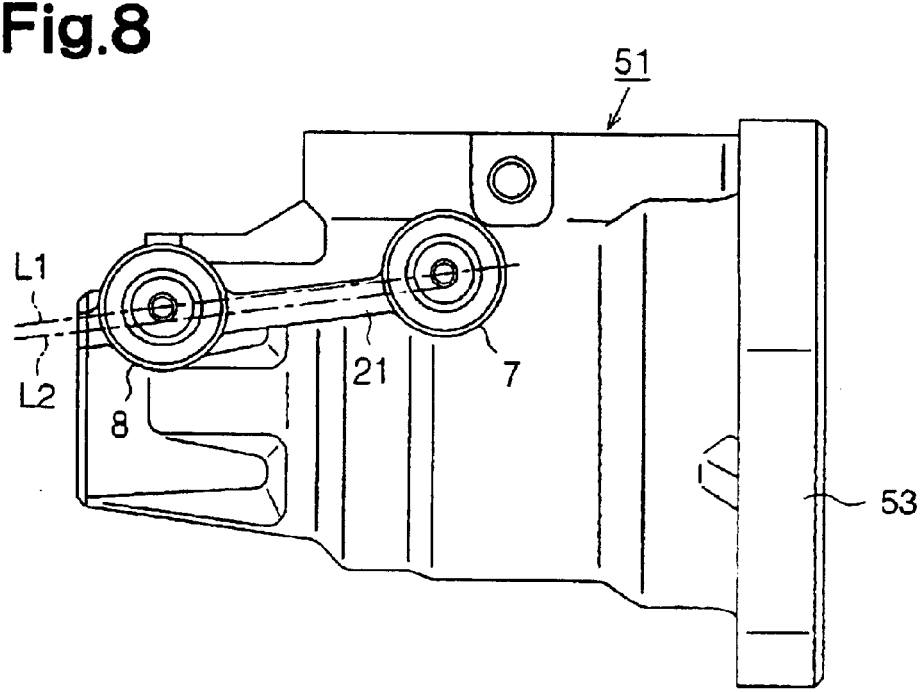
FIG. 8 is a right side view of the master cylinder body according to the second embodiment of the present invention.

That is, as shown in FIG. 8, the right side rib 21 is extended along the line L2 in parallel with the line L1 connecting the central axial lines of the first and the second outlet ports 7, 8 and is positioned below the line L1 (i.e., the position closer to the right side flange portion 53). That is, the right side rib 21 is extended between the external peripheral surface of the first outlet port 7 and the external peripheral surface of the second outlet port 8 and between the external peripheral surface of the second outlet port 8 and the tip end portion of the front end portion 4 along the line L2.

Figure 9:
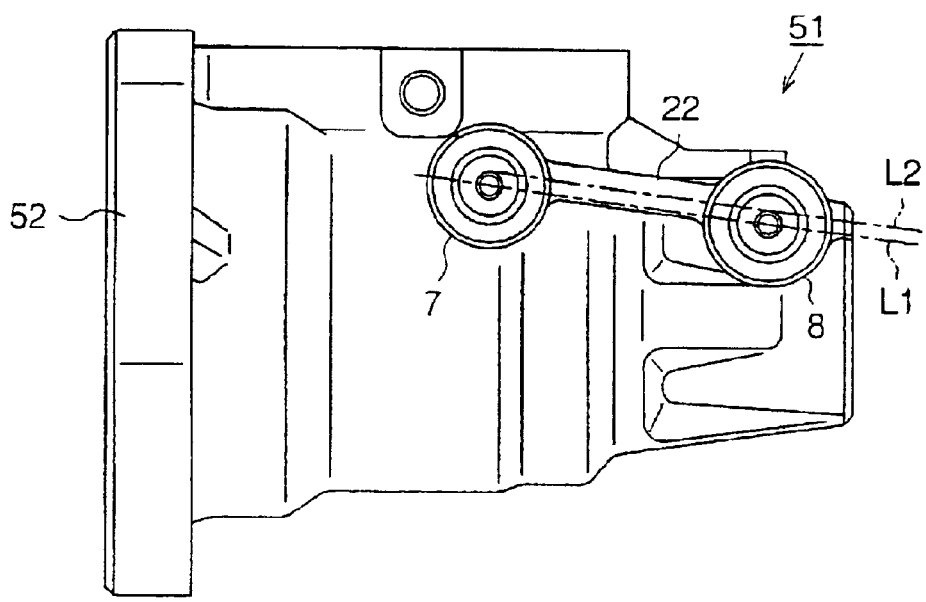
FIG. 9 is a left side view of the master cylinder body according to the second embodiment of the present invention.

On the other band, as shown in FIG. 9, the left side rib 22 is extended along the line L2 in parallel with the line L1 connecting the central axial lines of the first and the second outlet ports 7, 8 and is positioned above the line L1 (i.e., position closer to the left flange portion 52). That is, the left side rib 22 is extended between the external peripheral surface of the first outlet port 7 and the external peripheral surface of the second outlet port 8 and between the external peripheral surface of the second outlet port 8 and the tip end portion of the front end portion 4 along the line L2.

With respect to the master cylinder body 51 according to the second embodiment of the present invention, the following characteristics can be obtained.

According to the second embodiment of the present invention, the molding positions of the right side rib 21 and the left side rib 22 for restraining the generation of the casting cavity are deviated from the central position of the first and the second outlet ports 7, 8. Thus, because the melt of the aluminum alloy do not directly collide with the projections for molding the first and the second outlet ports 7, 8, when molding the master cylinder body 51, the abrasion of the projections can be restrained. Accordingly, the life duration of the die can be improved.

According to the second embodiment of the present invention, the molding position of the right side rib 21 and the left side rib 22 for restraining the generation of the casting cavity is displaced to the position closer to the flange portions 52, 53 from the central position of the first and the second outlet ports 7, 8. Thus, the melted aluminum alloy can be effectively poured into the flange molding recess portion for molding the flange portions 52, 53 when molding the master cylinder body 1. Accordingly, the dent and the casting cavity amount of the flange portions 52, 53 can be reduced.

The present invention is not limited to the foregoing embodiments and can be varied as follows.

The ribs 21, 22 of the first embodiment may be formed on upward position or one of the ribs 21, 22 may be formed on the downward position and the other of the ribs 21, 22 may be formed on the upward position. With this construction, the abrasion of the projections can be restrained and the life duration of the die can be improved.

Although the ribs 21, 22 are formed to be in parallel with the line L1 connecting the central axial lines of the outlet ports 7, 8, according to the first and the second embodiments of the present invention, it is not necessary to form the ribs 21, 22 being in parallel with the line L1. The only requirement of the positioning of the ribs 21, 22 is to be extended along the position deviated from the line L1.

According to the embodiments of the present invention, the abrasion of the portion of the die can be restrained and the life duration of the die can be improved.

According to the embodiments of the present invention, the melted aluminum alloy can be effectively poured into the side for forming the flange portion and the dent and the casting cavity amount of the flange portion can be reduced.

According to the embodiments of the present invention, because the rib is formed along the position deviated from the line connecting the central axial lines of the first and the second output port portions, the melt does not directly collide with the portion of the die for molding the first and the second output port portions when molding the master cylinder body, and thus the abrasion of the position of the die can be restrained. Accordingly, the life duration of the die can be improved.

According to the embodiments of the present invention, by displacing the position of the rib for restraining the generation of the casting cavity from the line connecting the central axial lines of the first and the second port portions to the side closer to the flange portion, the melted aluminum alloy can be effectively poured into the side for forming the flange portion when molding the maser cylinder body. Thus, the dent and the casting cavity amount of the flange portion can be reduced.

According to the embodiment of the present invention, because the rib molding recess portion is formed deviated from the projections formed on the first and the second port molding recess portions, the large amount of the melted aluminum alloy with high temperature poured into the first and the second port molding recess portions does not directly collide with the projections and smoothly flows rearward along the surface of the deviated side of the projections. Thus, the abrasion of the portion of the die can be restrained and the life duration of the die can be improved.

According to the embodiment of the present invention, because the rib molding recess portion is formed displaced to the side closer to the flange portion for connection relative to the line connecting the central axial lines of the projections, the melted aluminum alloy is effectively poured into the flange molding recess portion. Thus, the dent and the casting cavity amount of the flange portion can be reduced.

The principles, preferred embodiment and mode of operation of the present invention have been described in the foregoing specification. However, the invention which is intended to be protected is not to be construed as limited to the particular embodiments disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A master cylinder body comprising:
   a first output port for outputting hydraulic pressure:
   a second output port for outputting the hydraulic pressure;
   a rib formed between the first and the second output ports and extending from the first output port to a tip end portion of the master cylinder body via the second output port for improving a flow of melt;
   the rib formed along a position deviated from a line connecting central axial lines of the first and the second output ports; and a flange for connection provided on a base end portion of the master cylinder body;

wherein the rib is formed displaced to a side closer to the flange for connection relative to the line connecting the central axial lines of the first and the second output ports.

2. A master cylinder body according to claim 1, wherein the master cylinder body is molded by aluminum die casting.

3. A master cylinder body according to claim 1, wherein a pair of flanges is provided; and wherein each flange is extended outwardly in a radial direction of the master cylinder body respectively.

4. A master cylinder body according to claim 1, wherein a pair of flanges is provided; and wherein one of the flanges is extended outwardly in a diagonally upward direction relative to a horizontal line of the master cylinder body and the other of the flanges is extended outwardly in a diagonally downward direction relative to the horizontal line of the master cylinder body.

5. A master cylinder body according to claim 1, wherein the rib is formed to be in parallel with the line connecting the central axial lines of the first and the second output port portions ports.

6. A die of a master cylinder body which includes a first and a second output port for outputting hydraulic pressure and a rib formed along a position deviated from a line connecting central axial lines of the first and the second output ports and extending from the first output port to a tip end portion of the master cylinder body via the second output port for improving a flow of melt towards the tip end portion comprising:

a first port molding recess portion;

a second port molding recess portion;

a first projection formed on the first port molding recess portion;

a second projection formed on the second port molding recess portion; and a rib molding recess portion formed on a position deviated from a line connecting central axial lines of the first and second projections and extending from the first port molding recess portion to the tip end portion via the second port molding recess portion;

a flange molding recess portion for molding a flange portion for connection formed on a base end portion of the master cylinder body;

wherein the rib molding recess portion is formed on a side closer to the flange for connection relative to the line connecting the central axial lines of the first and the second projections.

* * * * *